Jan. 5, 1965  K. W. ARLEDGE  3,164,128
POULTRY FEEDER
Filed Nov. 23, 1962

KENNETH W. ARLEDGE
INVENTOR.

BY *Herbert J. Brown*

ATTORNEY

United States Patent Office 3,164,128
Patented Jan. 5, 1965

3,164,128
POULTRY FEEDER
Kenneth W. Arledge, 901 Kerry Lane, Azle, Tex.
Filed Nov. 23, 1962, Ser. No. 239,545
3 Claims. (Cl. 119—18)

This invention relates to poultry feeders and has reference to a device for dispensing feed to rows of cages in which laying hens are kept.

Generally, the invention is directed to improvements in that type of poultry feeder in which horizontal troughs are placed just outwardly of the cages and provided with an automatically operated feeding hopper for movement therealong. Although the dispensing hopper herein shown and described has two dispensing spouts, it is to be understood that a single spout moving along a single trough is within the spirit and intention of the invention.

An object of the invention is to provide means for scraping feed from the wall of the trough adjacent the cages which feed accumulates by reason of the poultry pulling their heads inwardly as they feed. Such accumulation is usually by reason of feed having moisture content, for example, grain mixed with molasses.

Another object of the invention is to provide a construction for automatically transferring feed from a storage bin to the hopper and whereby troughs of considerable length may be readily replenished.

Other objects of the invention include simplicity of construction, efficiency of operation and minimum maintenance requirements.

These and other objects will become apparent from the following description of the accompanying drawing, wherein.

Figure 1:
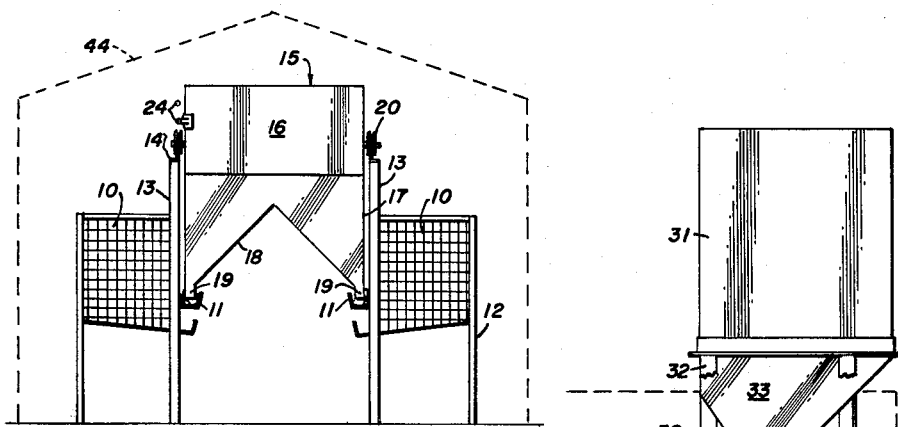
FIGURE 1 is an end view of a poultry feeder in accordance with the present invention and showing a poultry house in which the feeder is installed.
Figure 2:
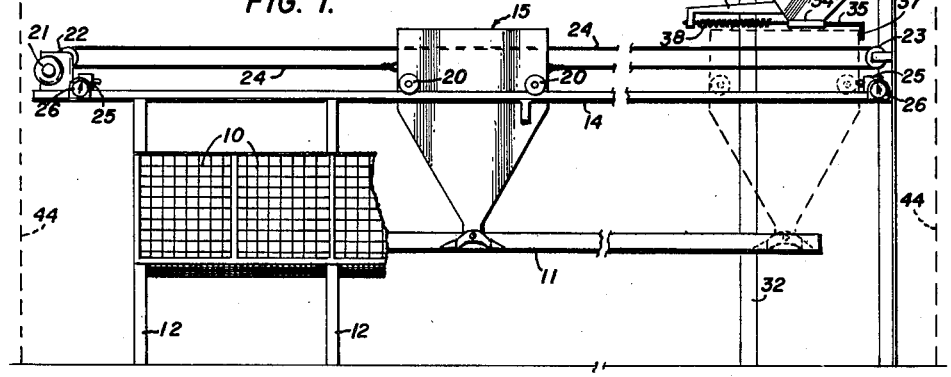
FIGURE 2 is a side elevational view of FIGURE 1 and additionally shows the storage bin arranged for coaction with the movable feeder hopper.

The form of the invention shown includes two rows of cages 10 having horizontal troughs 11 on opposing sides thereof. The outer sides of the cages 10 are supported on legs 12, whereas the inner sides of the cages are supported on taller legs 13 which extend above the cages and have parallel horizontal tracks 14 on their upper ends. The movable hopper shown, and generally designated by the numeral 15, is comprised of a rectangular upper portion 16 and having straight outer walls 17 and diverging inner walls 18 which have rectangular dispensing spouts 19 on their lower ends. As particularly shown in FIGURE 3 the lower ends of the dispensing spouts 19 are beneath the upper level of the troughs 11. As shown in FIGURES 1 and 2, the dispensing hopper 15 has grooved rollers 20 on its sides for engagement with the horizontal tracks 14. The hopper 15 is moved back and forth along the tracks 14 by means of a motor and gear box assembly 21 having a drive pulley 22 at one end of the tracks, a freely rotatable pulley 23 at the other end of the tracks and a cable 24 around the pulley and attached to opposite sides of the hopper. Limit switches 25 are mounted on opposite ends of the tracks 14 and are positioned so that the hopper 15 contacts the same and reverses the motor and gear box at each end of travel. Since the wiring of the motor and gear box and limit switches are well known to the art the same are not herein described in detail. Additionally, timers 26 may be provided for operation in conjunction with each limit switch 25 for delaying the return of the hopper 15 along its path.

Figure 3:
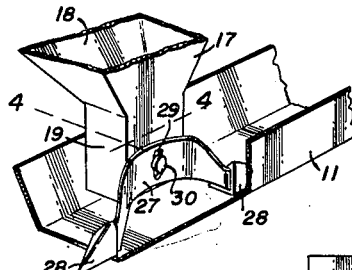
FIGURE 3 is a broken perspective view of one of the troughs and hopper dispensing chutes, together with a pivoted scraper for removing accumulated feed from the near side of the trough.
Figure 4:
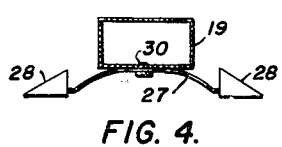
FIGURE 4 is a transverse section taken on line 4—4 of FIGURE 3.

As best shown in FIGURES 3 and 4, there is an arm 27 pivotally mounted intermediate its ends on the side of the dispensing spout 19, and which arm has scraper blades 28 on the ends thereof for scraping the side of the trough 11 adjacent the cages 10. As shown only in FIGURE 3 the arm 27 has a vertical slot 29 receiving a pin 30 mounted on the side of the dispenser spout 19.

Figure 5:
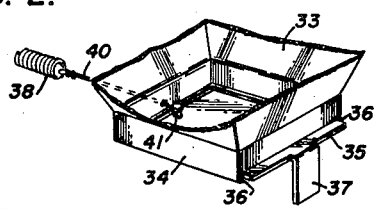
FIGURE 5 is an enlarged fragmentary perspective view of the lower end of the storage bin.

Above the tracks 14 at the end thereof opposite the motor and gear box 21 there is a storage bin 31 mounted on vertical legs 32. The upper portion of the storage bin 31 is rectangular and has converging walls 33 thereunder and a rectangular collar 34 around the lower open end for slidably receiving a closure plate 35. As shown in FIGURE 5, the collar 34 is notched at 36 for accomplishing the referred to sliding action, and the outer end of the plate has a depending arm 37 for contacting the hopper 15 when the latter moves beneath the storage bin 31. The plate 35 is normally in a closed position by reason of a spring 38 mounted on a bracket 39 and which spring has a cable 40 which enters a side of the collar 34 through an opening, not numbered, for attachment to a pin 41 on the plate 35.

Figure 6:
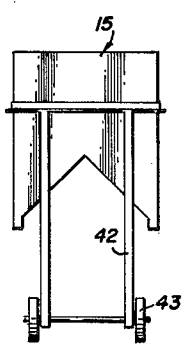
FIGURE 6 is an end elevational view of a movable dispensing hopper for operation on the floor of a poultry house.

The modified form of the invention illustrated in FIGURE 6 is in accordance with the foregoing except instead of the rollers 20 operating on tracks 14, the hopper 15 is mounted on a dolly having vertical legs 42 and rollers 43 therebeneath adapted to roll on the floor of a housing structure such as 44 illustrated in FIGURES 1 and 2.

In operation, the feed to be dispensed is first placed in the storage bin 31 and the cable 24 is actuated by means of the motor and gear box 21. As the dispensing hopper moves beneath the storage bin 31 the hopper engages the depending arm 37 of the slide plate and feedstuff is emptied from the bin to the hopper. Upon contacting the adjacent limit switch 25 the direction of travel is reversed and the feed in the hopper is dispensed along the length of the troughs 11. Upon reaching the opposite limit switch 25 the direction of travel is changed. As the hopper 15 moves along the troughs 11, the walls of the troughs adjacent the cages 10 are scraped by the blades 28 mounted on the pivoted arms 27. The direction of travel determines the angle of the blades 28, and irregularities in the trough are accommodated by the vertical slot 29 through which the supporting pin 30 is inserted.

The invention is not limited to the constructions herein shown and described, but may be made in various ways within the scope of the appended claims.

What is claimed is:

1. In combination with a row of cages having a feeding trough along one side thereof,
   a dispensing hopper having a dispensing spout extending into said trough,
   means moving said hopper along the length of said trough, and
   a scraper carried by said dispensing spout positioned to scrape the wall of said trough adjacent said cages.

2. The construction defined in claim 1 and wherein said scraper is comprised of an arm pivotally mounted on said dispensing spout, and
   scraper blades on the extending ends of said arm adjacent said wall of said trough.

3. In combination with a row of cages having a feeding trough along one side thereof, a dispensing hopper movable along the length of said trough, a scraper carried by said dispensing spout positioned to scrape the wall of said trough adjacent said cages, a storage bin above said trough at one end thereof, the lowermost portion of said storage bin being above the uppermost level of said hopper, a closure plate slidably mounted in the bottom of said bin, a depending arm on the end of said closure plate outwardly of said hopper, and a tension spring connected with said closure plate opposite said depending arm.

References Cited in the file of this patent
UNITED STATES PATENTS

| | | |
|---|---|---|
| 2,536,621 | Arnold | Jan. 2, 1951 |
| 2,685,863 | Martin | Aug. 10, 1954 |
| 2,735,400 | Stubbs | Feb. 21, 1956 |
| 2,786,447 | Murray | Mar. 26, 1957 |
| 2,807,234 | Middlen | Sept. 24, 1957 |
| 2,987,038 | Cole | June 6, 1961 |
| 3,077,862 | Naraghi | Feb. 19, 1963 |